United States Patent [19]

Shimada et al.

[11] 4,067,870
[45] Jan. 10, 1978

[54] 8-BENZIMIDO SUBSTITUTED QUINAPHTHALONE DERIVATIVES

[75] Inventors: Keizo Shimada; Toshiaki Harada; Masahiro Koga; Shizuo Nagahama, all of Hino, Japan

[73] Assignee: Teijin Limited, Osaka, Japan

[21] Appl. No.: 718,198

[22] Filed: Aug. 26, 1976

[30] Foreign Application Priority Data

Sept. 1, 1975 Japan .................................. 50-104938
Sept. 1, 1975 Japan .................................. 50-104941
Apr. 16, 1976 Japan .................................. 51-42327

[51] Int. Cl.² .............................................. C09B 25/00
[52] U.S. Cl. .......................... 260/287 F; 260/289 QP; 8/1 B
[58] Field of Search ...... 260/287 AR, 287 F, 289 QP

[56] References Cited

U.S. PATENT DOCUMENTS 3,301,860  1/1967  Clarke ........................... 260/289 QP
3,622,583  11/1971  Dehnert ......................... 260/289 QP

FOREIGN PATENT DOCUMENTS 480,406  10/1969  Switzerland ................... 260/289 QD Primary Examiner—Raymond V. Rush
Assistant Examiner—David E. Wheeler
Attorney, Agent, or Firm—Wenderoth, Lind & Ponack

[57] ABSTRACT

A compound of the following formula

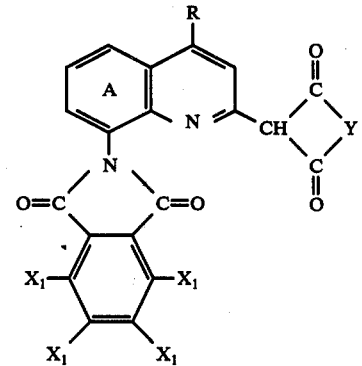

wherein R represents an alkyl group containing 1 to 4 carbon atoms or a phenyl group; $X_1$ represents a chlorine or bromine atom; Y represents the group of the formula

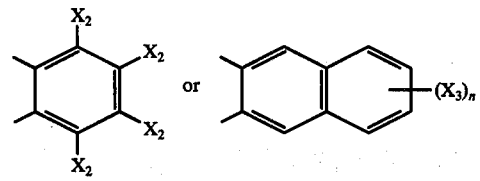

wherein $X_2$ and $X_3$ each represent a chlorine or bromine atom, and $n$ is an integer of 2 to 4; and ring A may be substituted by an alkyl group containing 1 to 4 carbon atoms and or a halogen atom.

The compound of formula (I) can be easily produced by reacting a quinoline derivative of the formula

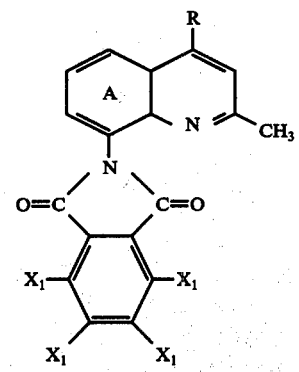

wherein R, $X_1$ and the ring A are the same as defined above, with an aryldicarboxylic acid or its reactive derivatives.

The compounds of formula (I) are useful as yellow organic pigments.

10 Claims, No Drawings

8-BENZIMIDO SUBSTITUTED QUINAPHTHALONE DERIVATIVES

This invention relates to quinoline derivatives, and more specifically, to novel quinoline derivatives, a process for their preparation, and their use as coloring agents.

A number of quinoline derivatives, particularly quinophthalone compounds, have been known heretofore. For example, U.S. Pat. No. 3,622,583 suggests compounds of the following formula

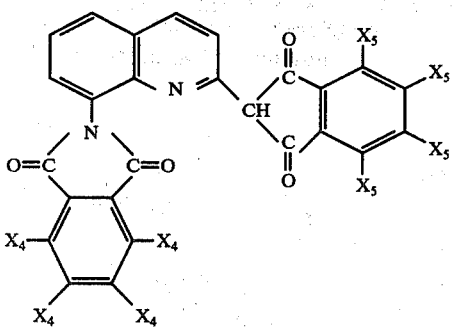

wherein $X_4$ and $X_5$, independently from each other, represent a chlorine or bromine atom, as yellow dyes. These quinoline derivatives suggested heretofore do not possess sufficient thermal stability, and suffer from a defect of discoloration when used in the melt shaping of polymeric materials, particularly synthetic resins having a high molding temperature such as polyolefins or polycarbonate.

We have now found that the thermal stability of the compounds of formula (IV) markedly increases when a lower alkyl group or a phenyl group, particularly a methyl group, is introduced into the 4-position of the quinoline skeleton.

It is an object of this invention therefore to provide novel quinoline derivatives having superior thermal stability and weatherability.

Another object of this invention is to provide a process for preparing novel quinoline derivatives having superior thermal stability and weatherability.

Still another object of this invention is to provide yellow pigments having superior thermal stability and weatherability.

Still another object of this invention is to provide polymeric materials colored by these pigments.

The other objects and features of the present invention will become apparent from the following description.

According to this invention, there is provided a compound of the following formula

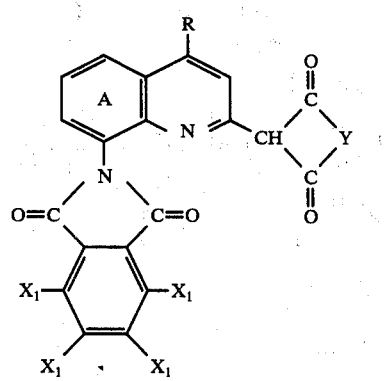

wherein R represents an alkyl group containing 1 to 4 carbon atoms or a phenyl group; $X_1$ represents a chlorine or bromine atom; Y represents the group of the following formula

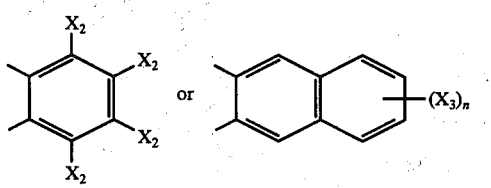

wherein $X_2$ and $X_3$ each represent a chlorine or bromine atom and $n$ is an integer of 2 to 4; and ring A may be substituted by an alkyl group containing 1 to 4 carbon atoms and/or a halogen atom.

The term "alkyl group", as used in the present application, is meant to include both straight-chain and branched-chain alkyl groups. The alkyl groups containing 1 to 4 carbon atoms include methyl, ethyl, n- or iso-propyl, and n-, iso-, sec- or tert-butyl. Of these, methyl is most preferred.

The term "halogen atom" includes chlorine, bromine, iodine and fluorine atoms, and the chlorine and bromine atoms are especially preferred.

Where the ring A is substituted in formula (I), the number of the substituents is 1 or 2, desirably 1, and they may be present at any of the 5-, 6- and 7-positions of the quinoline ring.

The compounds of formula (I) provided by the present invention can form tautomeric structures shown by the following formulae.

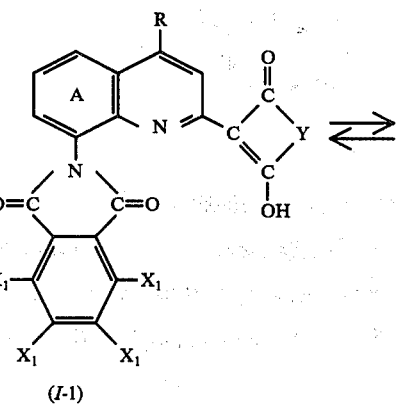

-continued

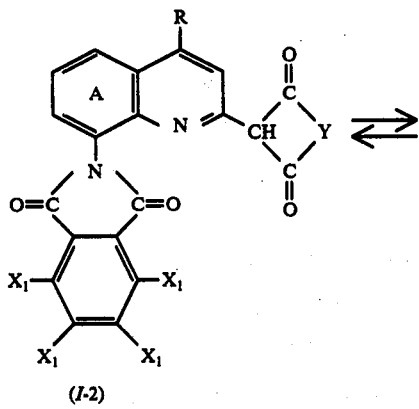

(I-2)

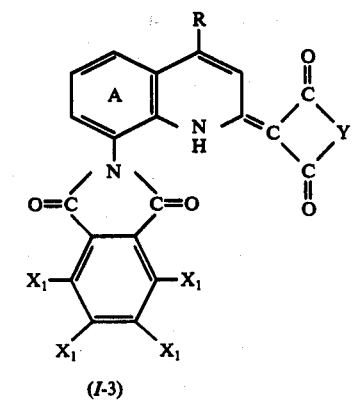

(I-3)

In the present specification and the appended claims, the compounds of this invention are expressed by formula (I), that is, formula (I-2) for the sake of convenience, but it should be understood that this structural formula (I) is meant to include all of the tautomeric structures of formulae (I-1), (I-2) and (I-3).

Of the compounds of formula (I), a preferred group of compounds are those in which R is methyl, and another preferred group of compounds are compounds of formula (I) in which Y represents

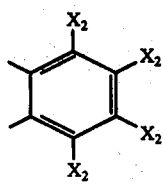

wherein $X_2$ is the same as defined above. Still another preferred group of compounds are compounds of formula (I) in which the ring A is unsubstituted.

Thus, especially preferred compounds in the present invention are compounds of formula (I-a)

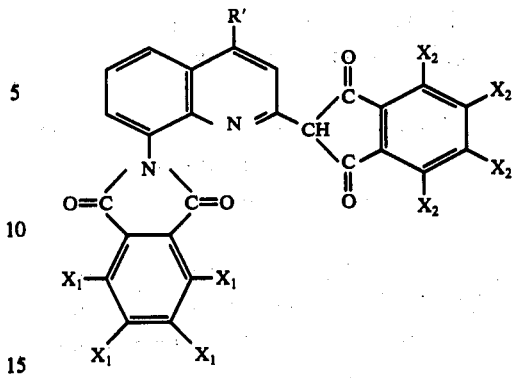

wherein R' represents an alkyl group containing 1 to 4 carbon atoms, and $X_1$ and $X_2$ are the same as defined hereinabove. In view of the particularly superior thermal stability, 4-methyl-substituted quinoline derivatives of the following formula

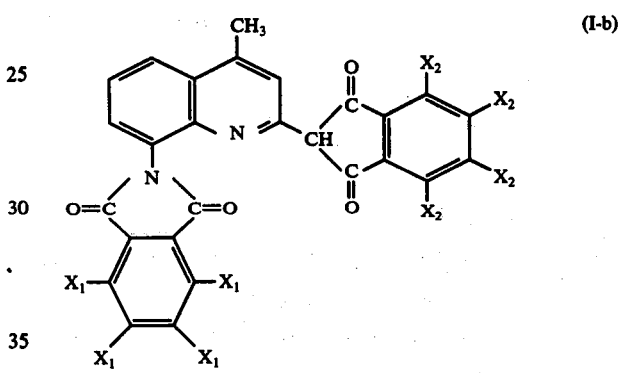

wherein $X_1$ and $X_2$ are the same as defined above, are most preferred.

Typical examples of the compounds of formula (I), (I-a), or (I-b) of this invention are listed below.
(1) 2-(4',5',6',7'-tetrachloro-1',3'-indanedionyl-2')-4-methyl-8-tetrachlorophthalimidoquinoline.
(2) 2-(4',5',6',7'-tetrabromo-1',3'-indanedionyl-2')-4-methyl-8-tetrachlorophthalimidoquinoline.
(3) 2-(4',5',6',7'-tetrachloro-1',3'-indanedionyl-2')-4-methyl-8-tetrabromophthalimidoquinoline.
(4) 2-(4',5',6',7'-tetrabromo-1',3'-indanedionyl-2')-4-methyl-8-tetrabromophthalimidoquinoline.
(5) 2-[4',5',6',7'-tetrachloro(or tetrabromo)-1',3'-indanedionyl-2']-4-ethyl-8-tetrachloro(or tetrabromo) phthalimidoquinoline.
(6) 2-[4',5',6',7'-tetrachloro(or tetrabromo)-1',3'-indanedionyl-2']-4-butyl-8-tetrachloro(or tetrabromo) phthalimidoquinoline.
(7) 2-[4',5',6',7'-tetrachloro(or tetrabromo)-1',3'-indanedionyl-2']-4-phenyl-8-tetrachloro(or tetrabromo)-phthalimidoquinoline.
(8) 2-[5',6'-(i",4"-dibromo)benzo-1',3'-indanedionyl-2']-4-methyl-8-tetrachloro(or tetrabromo)-phthalimidoquinoline.
(9) 2-[5',6'-(1",4"-dichloro)benzo-1',3'-indanedionyl-2']-4-methyl-8-tetrachloro(or tetrabromo)-phthalimidoquinoline.
(10) 2-[5',6'-(1",2",3",4"-tetrabromo)benzo-1',3'-indanedionyl-2']-4-methyl-8-tetrachloro(or tetrabromo)-phthalimidoquinoline.

(11) 2-[4',5',6',7'-tetrachloro-1',3'-indanedionyl-2']-4,5-dimethyl-8-tetrachlorophthalimidoquinoline.

(12) 2-[4',5',6',7'-tetrabromo-1',3'-indanedionyl-2']-4,6-dimethyl-8-tetrabromophthalimidoquinoline.

(13) 2-[4',5',6',7'-tetrachloro-1',3'-indanedionyl-2']-4-methyl-5-chloro-8-tetrabromophthalimidoquinoline.

The compound of formula (I) can be easily produced, for example, by reacting a quinoline derivative of the formula

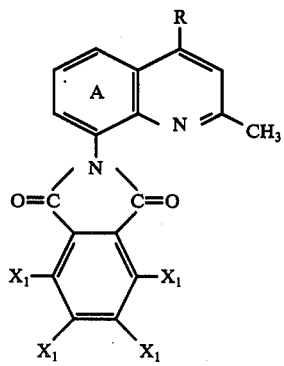

(II)

wherein R, $X_1$ and the ring A are the same as defined hereinabove, with an aryldicarboxylic acid of the following formula

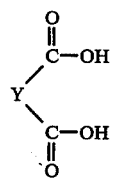

(III)

wherein Y is the same as defined hereinabove, or its reactive derivative.

The reaction between the quinoline derivative of formula (II) and the aryldicarboxylic acid of formula (III) or its reactive derivative may be carried out in the absence of solvent. Generally, however, it is performed in the presence of a solvent. Useful solvents are organic solvents which are inert under the reaction conditions, for example, hydrocarbons such as decalin, tetralin or trimethylbenzene; halogenated hydrocarbons such as dichlorobenzene, trichlorobenzene or chloronaphthalene; nitrated hydrocarbons such as nitrobenzene; ethers such as diphenyl ether; and N-methylpyrrolidone.

The reaction is carried out generally under heat. The heating temperature can be varied over a wide range according, for example, to the types and proportions of the starting materials, or the type of the solvent. Usually, it is 100° to 350° C, preferably 150° to 300° C. The reaction pressure is usually normal atmospheric pressure, but if desired, the reaction may be performed at a reduced or elevated pressure. Within the above temperature range, the reaction ends generally in 2 to 10 hours.

The proportions of the quinoline derivative of formula (I) and the aryldicarboxylic acid of formula (II) or its reactive derivative are not critical, but can be varied over a wide range according, for example, to the starting materials or the reaction conditions. It is generally advantageous that the aryldicarboxylic acid or its reactive derivative is used in an amount at least equimolar to the quinoline derivative, preferably in a somewhat excessive amount (1.2 to 3 molar times), expecially about 1.5 molar times.

The reaction sufficiently proceeds by heating the two starting materials under the above reaction conditions, but advantageously, the reaction could be carried out in the presence of a catalytic amount of a Friedel-Crafts catalyst, such as zinc chloride, aluminium chloride, antimony pentoxide, iron trichloride, tin tetrachloride, or titanium tetrachloride, especially anhydrous zinc chloride. This is especially required when the reaction temperature is relatively low, for example, not more than about 250° C because at such temperatures, the rate of the reaction decreases.

The quinoline derivative of formula (II) used as a starting material is a novel compound, and can be prepared, for example, by reacting an 8-aminoquinaldine derivative of the following formula

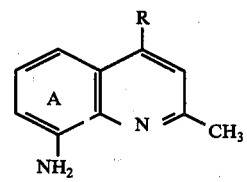

(V)

wherein R and the ring A are same as defined hereinabove, with an aryldicarboxylic acid of the following formula

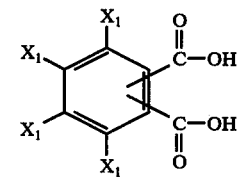

(VI)

wherein $X_1$ is the same as defined hereinabove, or its reactive derivative.

The reaction between the compound of formula (V) and the compound of formula (VI) or its reactive derivative can be performed by heating these compounds in the absence of a solvent, or preferably in the presence of a solvent of the type described hereinabove. Generally, this reaction is carried out under milder reaction conditions than the reaction conditions used to react the quinoline derivative of formula (II) with the aryldicarboxylic acid of formula (III) or its reactive derivative. For example, the heating temperature is generally 100° to about 250° C. But when the reaction temperature increases, not only will the amino group at the 8-position of the compound of formula (V) be condensed with the compound of formula (VI) or its reactive derivative, but also there will be an increasing tendency for the methyl group at the 2-position to be attacked by the compound of formula (VI). When such a high reaction temperature is used, appropriate measures, such as the shortening of the reaction time, are taken to produce the compound of formula (II) predominantly. This reaction does not require catalysts, when the reactive derivative of the compound of formula (VI) is used.

The ratio between the compound of formula (V) and the compound of formula (VI) is not critical, but advantageously, the molar ratio of the former to the latter is adjusted to about 1 : 1 to about 1 : 1.2.

The compound of formula (II) so prepared may be used in the reaction of forming the quinone derivative in accordance with this invention, either directly without isolation, or after isolation.

According to another aspect of this invention, compounds of the following formula

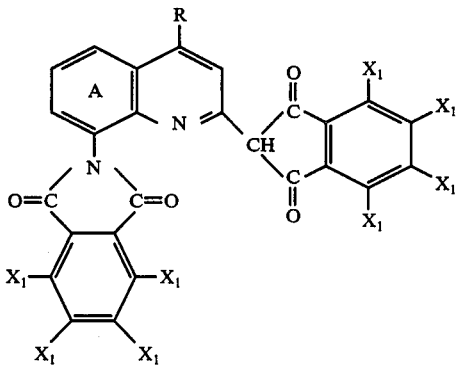

(I-c)

wherein R, $X_1$ and the ring A are the same as defined hereinabove, can be directly prepared from the 8-aminoquinaldine derivative of formula (V) using the aryldicarboxylic acid of formula (VI) or its reactive derivative as the aryldicarboxylic acid of formula (III) or its reactive derivative. The compounds of formula (I-c) above correspond to those of formula (I) in which Y is the same as

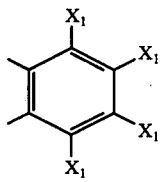

In this case, the 8-aminoquinaldine derivative of formula (V) can be reacted with the aryldicarboxylic acid of formula (VI) or its reactive derivative under the same reaction conditions as described hereinabove with regard to the reaction of the quinoline derivative of formula (II) with the aryldicarboxylic acid of formula (III) or its reactive derivative. The ratio between the compound of formula (V) and the compound of formula (VI) is not critical, but advantageously, at least 2 moles (preferably up to about 6 moles) of the compound of formula (VI) is used per mole of the compound of formula (V).

Typical examples of the 8-aminoquinaldine derivatives of formula (V) used as a starting material in the above-mentioned reaction are 4-methyl-8-aminoquinaldine, 4-ethyl-8-aminoquinaldine, 4-butyl-8-aminoquinaldine, 4-phenyl-8-aminoquinaldine, 4,5-dimethyl-8-aminoquinaldine, 4,6-dimethyl-8-aminoquinaldine, and 4-methyl-5-chloro-8-aminoquinaldine.

Examples of the aryldicarboxylic acids of formula (III) or (VI) to be reacted with the quinoline derivative of formula (II) or the 8-aminoquinaldine derivative of formula (V) are as follows:

Compounds of formula (VI)
tetrachlorophthalic acid, and
tetrabromophthalic acid.
Compounds of formula (III)

In addition to the compounds exemplified with regard to formula (VI), 5,8-dichloronaphthalene-2,3-dicarboxylic acid, 5,8-dibromonaphthalene-2,3-dicarboxylic acid, 5,6,7,8-tetrachloronaphthalene-2,3-dicarboxylic aicd, and 5,6,7,8-tetrabromonaphthalene-2,3-dicarboxylic acid.

Advantageously, the reactive derivatives of these aryldicarboxylic acids include anhydrides or esters, especially lower alkyl esters.

The resulting compound of formula (I) can be separated from the reaction mixture, and purified by any methods known per se. For example, the reaction mixture after the reaction is cooled, and the resulting precipitate is separated and recovered by, for example, filtration, or centirifugal separation. The compound of formula (I) so recovered has sufficiently high purity, and can be used in applications to be described below. It may, if desired, be further purified by washing with an organic solvent, for example, alcohols such as methanol or ethanol, ketones such as acetone or methylethyl ketone, or amides such as dimethyl formamide or dimethylacetamide.

The compound of formula (I) can be subjected to a pigment-conditioning treatment by a method known in the art of pigment chemistry. For example, the compound is dissolved in conc. sulfuric acid, and the solution is poured into water to re-precipitate the compound in the form of fine powder. Or the compound is finely pulverized by a pulverizer such as a ball mill.

The compounds of formula (I) provided by the present invention has yellow colors, and superior thermal stability, weatherability and resistance to migration. In particular, compounds of formula (I-b) have outstanding thermal stability among compounds of formula (I), and are especially preferred in the present invention.

The compounds of formula (I) of this invention are useful as yellow organic pigments, and just the same as ordinary organic pigments, can be used in a wide range of applications, for example, for coloring polymeric shaped articles, or as coloring components of paints, printing inks, crayon, painting pastes, or textile printing pastes.

In particular, the compounds of formula (I) of this invention can be avantageously used for coloring polymeric materials. Examples of such polymeric materials include polyolefins, polystyrene, acrylic resins, vinyl resins, polyamides, polyesters, acetal resins, polycarbonate, amino resins, regenerated cellulose, epoxy resins, phenolic resins, urea resins, melamine resins, and polyimides.

In the present specification and the appended claims, the term "polymeric material" is meant to include not only shaped articles prepared from the above resins, but also compositions containing these resins as a binder, carrier, or vehicle, etc., for example, paints, printing inks and textile printing pastes.

One procedure available for coloring a shaped article of a resin using the compound of formula (I) comprises incorporating the compound of formula (I) in the desired amount (for example, 0.05 to 1 part by weight, preferably 0.1 to 0.5 part by weight, per 100 parts by weight of the resin) in the resin, melting or melt-kneading the blend, and fabricating it into a desired shape such as a film, sheet, plate, pipe, tube, filament, or pellet by a conventional resin fabricating method such as compression molding, injection molding, calendering, or extrusion. According to another method, the compound of formula (I) is incorporated in advance to monomers or prepolymers for forming the resin, and the mixture is polymerized, and fabricated to form a colored shaped article of the resin in the above-mentioned form (the cast shaping method).

The compound of formula (I) can also be used to color fibers, woven or knitted fabrics, or nonwoven fabrics. It can be applied by a dip dyeing method same as in the case of disperse dyes, or by a textile printing technique.

The compounds of formula (I) can also be used as coloring components in paints and printing inks, and made into paints or printing inks by blending basic components of conventional paints, lacquers, baking paints, powder paints, aqueous emulsion paints, or printing inks, etc.

The following Examples and Comparative Examples further illustrate the present invention.

EXAMPLE 1

240 Parts of α-chloronaphthalene was added to 34.4 parts of 4-methyl-8-aminoquinaldine and 143 parts of tetrachlorophthalic anhydride, and the mixture was refluxed at the boiling point. While removing water out of the reaction system, the reaction was performed for 5 hours. The reaction mixture was hot-filtered to afford a yellow reaction product. The product was heated with stirring together with 360 parts of α-chloronaphthalene to wash it, hot-filtered, and dried to afford 113 parts of a yellow product of the following formula [VII] having a melting point of more than 360° C.

The analysis values of the product were as follows:

| | Elemental analysis (for $C_{27}H_8O_4N_2Cl_8$) | | | |
|---|---|---|---|---|
| | C | H | N | Cl |
| Calculated(%) | 45.81 | 1.14 | 3.96 | 40.06 |
| Found (%) | 45.95 | 1.08 | 4.04 | 40.25 |

Infrared absorption spectrum (IR KBr): 1790, 1735 $cm^{-1}$ (—CO—N—CO—), 1673, 1623 $cm^{-1}$ (—CO—C—CO—), 1380 $cm^{-1}$ (—$CH_3$).

Visual absorption spectrum (dimethyl formamide solution): $\lambda_{max} = 424$ mμ.

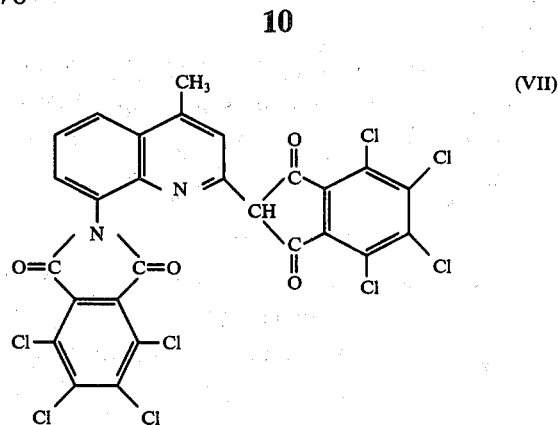

(VII)

1.5 Parts of a novel compound of the structural formula [VII] above was blended with 1,000 parts of a polyethylene resin, and the mixture was extruded at 230° C using a melt-extruder to form yellow-colored pellets.

The pellets were injection-molded under the conditions shown in Table 1 to form molded plates.

Using a molded plate obtained under the conditions of 240° C, 1 minute as a standard, the color difference "ΔE" was measured by a color difference meter in accordance with a UCS (Uniform Chromaticity Scale) Lab system. The results are shown in Table 1.

Using a compound of the following structural formula [VIII], molded plates were produced under the same conditions as above. The ΔE values were measured by a color difference meter, and the results are shown in Table 1 as Comparative Example 1.

The figures shown in Table 1 are relative values to ΔE=0 at 240° C.

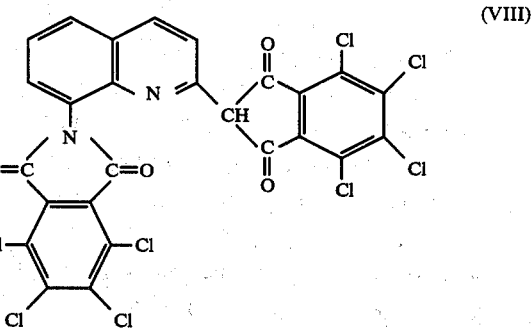

(VIII)

Table 1

| | | Cylinder temperature (° C) | 240 | 240 | 260 | 280 | 300 |
|---|---|---|---|---|---|---|---|
| | | Residence time (minutes) | 1 | 5 | 5 | 5 | 5 |
| | Compound | | | ΔE | ΔE | ΔE | ΔE |
| Example 1 | VII | | Standard (0) | +0.85 | +1.15 | +1.84 | +3.71 |
| Comparative Example 1 | VIII | | " | +1.14 | +2.40 | +8.16 | +13.92 |

As can be seen from Table 1, the novel compound of formula [VII] in accordance with this invention changes in color to a lesser extent than the compound of formula [VIII], and therefore has superior thermal stability.

When the molded plate produced by injection molding at 240° C for 1 minute was exposed to a Weather-Ometer, its light fastness was better than grade 6 on a blue scale.

EXAMPLE 2

The procedure of Example 1 was repeated except that 232 parts of tetrabromophthalic anhydride was used instead of the tetrachlorophthalic anhydride. As a result, 166 parts of a yellow compound of the following formula was obtained.

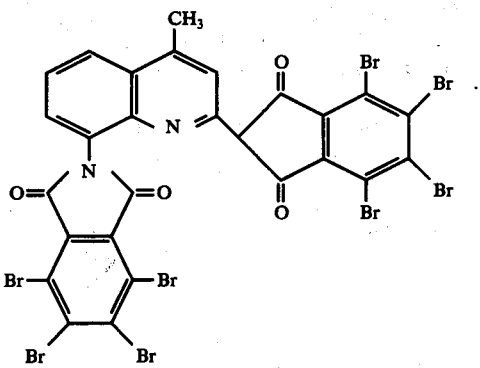

The analysis values of the product were as follows:

| | Elemental analysis (for $C_{27}H_8O_4N_2Br_8$) | | | |
|---|---|---|---|---|
| | C | H | N | Br |
| Calculated (%) | 30.48 | 0.67 | 2.63 | 60.11 |
| Found (%) | 30.55 | 0.82 | 2.49 | 60.34 |

Infrared absorption spectrum (IR KBr): 1770, 1725 cm$^{-1}$ (—CO—N—CO—), 1668, 1610 cm$^{-1}$ (—CO—C—CO—), 1370 cm$^{-1}$ (—CH$_3$).

Visual absorption spectrum (dimethyl formamide solution): $\lambda_{max}$ = 428 m$\mu$.

EXAMPLE 3

17 Parts of 4-methyl-8-aminoquinaldine and 29 parts of tetrachlorophthalic anhydride were heated in 200 parts of trichlorobenzene, and reacted for 2 hours at the boiling point while removing the generated water out of the reaction system. Then, 69 parts of tetrabromophthalic anhydride and 4 parts of zinc chloride were added, and the reaction was performed for 3 hours. 50 Parts of dimethyl formamide was added, and the mixture was heated for another one hour. The product was separated by filtration at 120° C, washed with 100 parts of dimethyl formamide and then with ethanol, and dried to afford 52 parts of a yellow compound having the following structural formula:

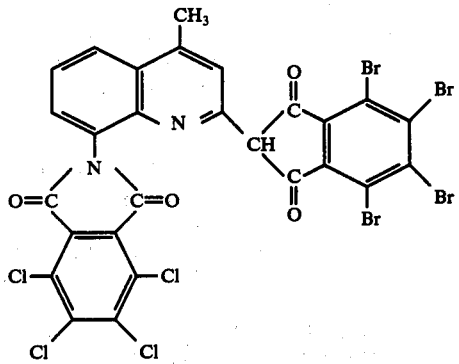

The analysis values of the product were as follows:

| | Elemental analysis (for $C_{27}H_8O_4N_2Cl_4Br_4$) | | | |
|---|---|---|---|---|
| | C | H | N | Halogen |
| Calculated (%) | 36.61 | 0.91 | 3.16 | 52.10 |
| Found (%) | 36.45 | 0.96 | 3.02 | 51.63 |

Infrared absorption spectrum (IR KBr): 1782, 1733 cm$^{-1}$ (—CO—N—CO—), 1670, 1618 cm$^{-1}$ (—CO—C—CO—), 1380 cm$^{-1}$ (—CH$_3$).

Visual absorption spectrum (dimethyl formamide solution): $\lambda_{max}$ = 427 m$\mu$.

EXAMPLE 4

62 Parts of 8-tetrabromophthalimide-4-methylquinoldine and 43 parts of tetrachlorophthalic anhydride were dissolved in 200 parts of diphenyl ether, and reacted for 5 hours at the boiling point. The reaction mixture was hot-filtered at 120° C, and dispersed in 100 parts of dimethyl formamide. The dispersion was stirred at 120° C for 6 hours. After separation by filtration, the product was washed with ethanol to afford 54 parts of a yellow compound of the following structural formula:

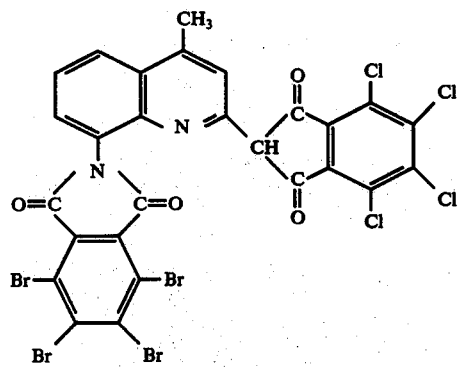

The analysis values of the product were as follows:

| | Elemental analysis (for $C_{27}H_8O_4N_2Cl_4Br_4$) | | | |
|---|---|---|---|---|
| | C | H | N | Halogen |
| Calculated (%) | 36.61 | 0.91 | 3.16 | 52.10 |
| Found (%) | 36.53 | 1.02 | 3.23 | 51.89 |

Infrared absorption spectrum (IR KBr): 1770, 1725 cm$^{-1}$ (—CO—N—CO—), 1660, 1614 cm$^{-1}$ (—CO—C—CO—), 1370 cm$^{-1}$ (—CH$_3$).

Visual absorption spectrum (dimethyl formamide solution): $\lambda_{max}$ = 425 m$\mu$.

EXAMPLE 5

3 Parts of a quinophthalone pigment of formula [VII] used in Example 1 was blended with 1,500 parts of polycarbonate, and the mixture was melt-extruded at 260° to 265° C to afford yellow-colored pellets. The pellets were injection-molded at 280° C by a customary method to form a molded plate. When the molded plate was exposed to a Weather-Ometer, and evaluated on a blue scale, its weatherability was better than grade 6.

EXAMPLE 6

0.6 Part of a quinophthalone pigment of formula [VII] used in Example 1 and 3 parts of a rutile-type titanium oxide were blended with 600 parts of a polypropylene resin. The mixture was melt-extruded at 220° to 230° C by an extruder to afford yellow-colored pellets. The pellets were injection-molded under the conditions shown in Table 4 to afford molded plates which were vividly colored yellow. No color change ascribable to differences in injection-molding conditions was observed, and the products showed superior thermal stability.

Table 4

| Cylinder temperature (° C) | Residence time (minutes) |
|---|---|
| 230 | 10 |
| 230 | 20 |
| 230 | 30 |
| 250 | 10 |
| 250 | 20 |
| 250 | 30 |

EXAMPLE 7

One part of a quinophthalone pigment having the following structural formula

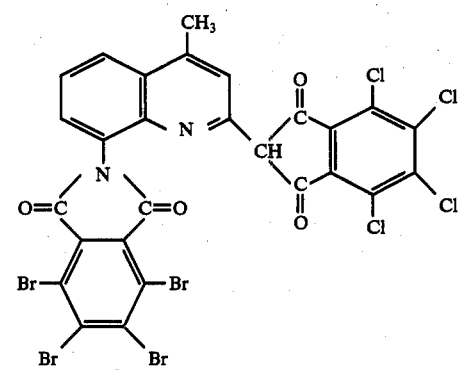

386 parts of calcium carbonate, 4 parts of zinc stearate, 25 parts of a styrene monomer, and 35 parts of finely divided polyethylene were mixed by a ball mill. The resulting mixture was mixed with 300 parts of glass fibers, 240 parts of an isophthalic acid-type unsaturated polyester resin and 10 parts of calcium hydroxide. A polymerization initiator was added, and the mixture was molded at 180° C. A reinforced polyester molded article colored vivid yellow was obtained.

EXAMPLE 8

Each of the powdery pigments obtained in the above Examples (shown in Table 5 by the numbers of the Examples) was mixed with each of the various resins shown in Table 5. Each of the mixtures obtained was melted, and injection-molded under four temperature-time conditions chosen from both ends of each temperature or time range and two points within the range. The differences in color between the molded plates were determined visually to evaluate their thermal stability.

The resulting molded plates were subjected to a carbon arc lamp test using a Weather-Ometer, and the weatherability of the specimens was determined by a blue scale.

Table 5

| | Experimental conditions | | | | Evaluation | |
|---|---|---|---|---|---|---|
| Run No. | Pigment | Content (%) | Resin | Injections-molding conditions | Thermal stability | Weather-ability |
| 8-1 | 1 | 0.1 | Polystyrene | 220–280° C, 2 minutes | No discoloration | More than grade 6 |
| 8-2 | 2 | 0.1 | Polystyrene | 220–280° C, 2 minutes | " | " |
| 8-3 | 2 | 0.1 | Polyethylene | 240–280° C, 5 minutes | " | " |
| 8-4 | 2 | 0.15 | Polycarbonate | 300° C, 2–20 minutes | " | " |
| 8-5 | 2 | 0.1 | Polypropylene (containing 0.5% TiO$_2$) | 230° C, 10 min. to 250° C, 30 min. | " | — |
| 8-6 | 3 | 0.1 | Polystyrene | 220–280° C, 2 minutes | " | " |
| 8-7 | 3 | 0.1 | Polyethylene | 240–280° C, 5 minutes | " | " |
| 8-8 | 4 | 0.15 | Polycarbonate | 300° C, 2–20 min. | " | " |
| 8-9 | 4 | 0.1 | Polypropylene (containing 0.5% TiO$_2$) | 230° C, 10 minutes to 250° C, 30 minutes | " | — |

What we claim is:
1. A compound of the following formula

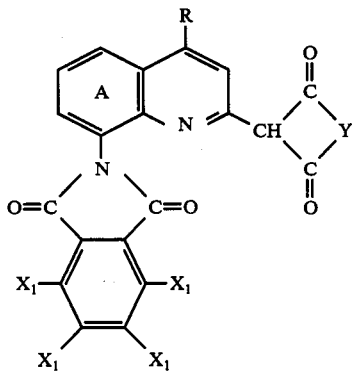

wherein R represents an alkyl group containing 1 to 4 carbon atoms; $X_1$ represents a chlorine or bromine atom; Y represents the group of the formula

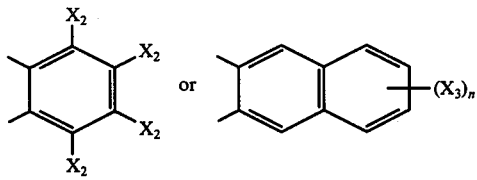

wherein $X_2$ and $X_3$ each represent a chlorine or bromine atom, and $n$ is an integer of 2 to 4; and ring A may be substituted by an alkyl group containing 1 to 4 carbon atoms, a halogen atom, or both.

2. The compound of claim 1 wherein R is a methyl group.

3. The compound of claim 1 wherein Y is the group of the formula

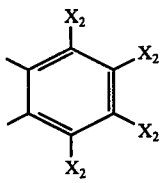

wherein $X_2$ represents a chlorine or bromine atom.

4. The compound of claim 1 wherein the ring A is unsubstituted.

5. The compound of claim 1 expressed by the following formula

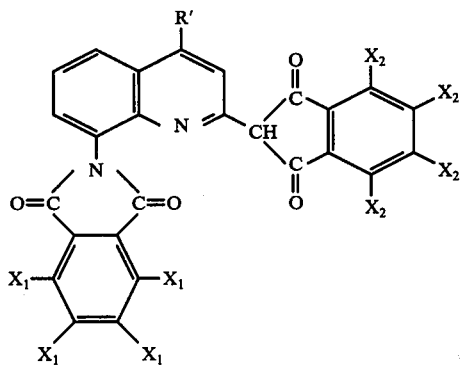

(I-a)

wherein R' represents an alkyl group containing 1 to 4 carbon atoms, and $X_1$ and $X_2$ each represent a chlorine or bromine atom.

6. The compound of claim 1 expressed by the following formula

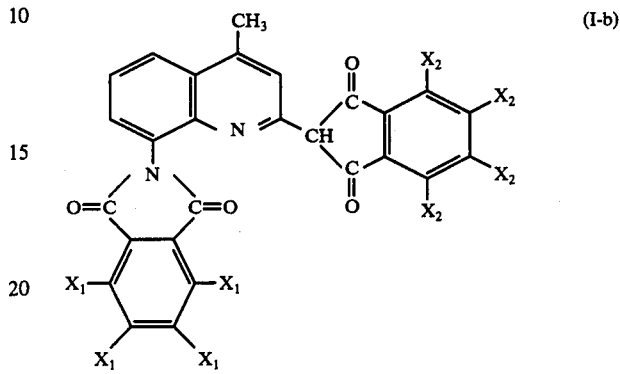

(I-b)

wherein $X_1$ and $X_2$ each represent a chlorine or bromine atom.

7. The compound of claim 1 expressed by the following formula:

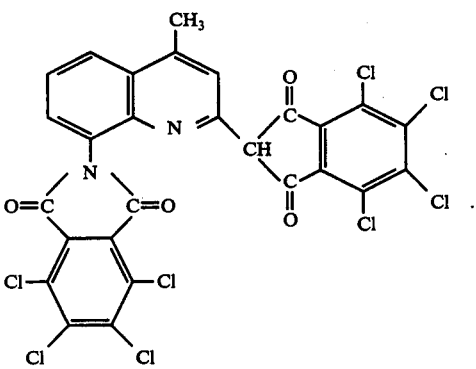

8. The compound of claim 1 expressed by the following formula:

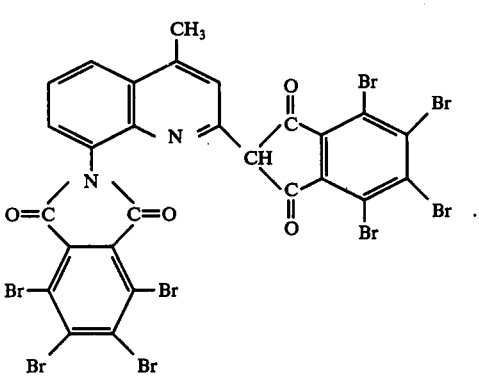

9. The compound of claim 1 expressed by the following formula:

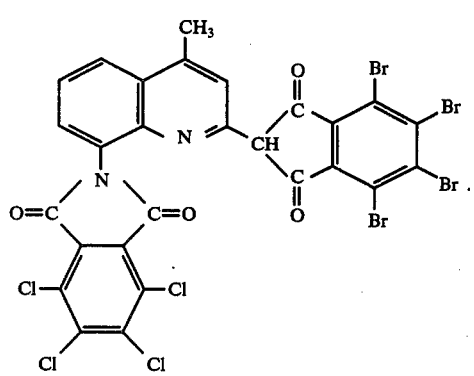
10. The compound of claim 1 expressed by the following formula:
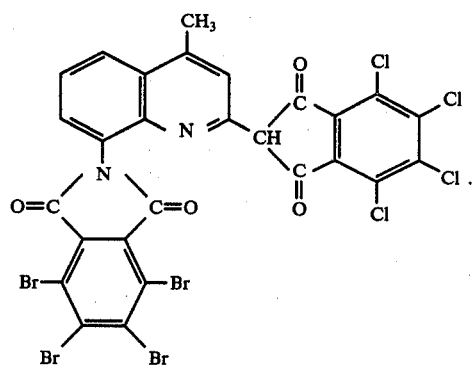
* * * * *